US006447553B1

(12) United States Patent
Mikhael et al.

(10) Patent No.: US 6,447,553 B1
(45) Date of Patent: Sep. 10, 2002

(54) VACUUM-DEPOSITED COLORANTS

(75) Inventors: Michael G. Mikhael; Angelo Yializis, both of Tucson, AZ (US)

(73) Assignee: Sigma Technologies International, Inc., Tucson, AZ (US)

( * ) Notice: Subject to any disclaimer, the term of this patent is extended or adjusted under 35 U.S.C. 154(b) by 0 days.

(21) Appl. No.: 09/695,746

(22) Filed: Oct. 24, 2000

(51) Int. Cl.$^7$ ................................. C09B 62/00
(52) U.S. Cl. ...................... 8/524; 524/700; 524/714; 524/715; 524/742; 524/765; 106/499; 106/493; 106/496; 427/497; 427/294; 427/398.4
(58) Field of Search ................ 524/700, 714, 524/742, 715, 765; 8/524; 106/499, 493, 496; 427/497, 294, 398.4

(56) References Cited

U.S. PATENT DOCUMENTS

| | | | |
|---|---|---|---|
| 4,017,476 A | 4/1977 | Murray et al. | 260/144 |
| 4,486,237 A | 12/1984 | Paffoni et al. | 106/308 |
| 5,106,421 A | 4/1992 | Marshall, Jr. | 406/499 |
| 5,470,502 A | 11/1995 | Hahn et al. | 252/301.25 |
| 5,710,197 A | 1/1998 | Fischer et al. | 524/82 |
| 5,795,379 A | 8/1998 | Schwenk et al. | 106/499 |
| 5,871,872 A | 2/1999 | Matijevic et al. | 430/7 |
| 5,875,169 A | * 2/1999 | Hatwar | |
| 6,040,017 A | * 3/2000 | Mikhael et al. | |
| 6,051,360 A | * 4/2000 | Karasawa et al. | |

FOREIGN PATENT DOCUMENTS

DE  WO 99/40123  8/1999

OTHER PUBLICATIONS

Thorsten, Clemens et al., "Nanocolorants—Pigments with Dyestuff Properties," Polymer Preprints 2000, 41(1), 24.

* cited by examiner

*Primary Examiner*—Robert Dawson
*Assistant Examiner*—Kuo-Liang Peng
(74) *Attorney, Agent, or Firm*—Antonio R. Durando; Durando Birdwell & Janke, PLC

(57) ABSTRACT

A radiation curable monomer and a dystuff are mixed in a curable formulation and fed into a hot evaporator under vacuum. The blend is flash evaporated through a nozzle and recondensed onto a moving substrate in contact with a temperature-controlled rotating drum. The condensed film is then crosslinked with a high-energy ultraviolet or electron-beam radiation source to effect cross-linking of the monomer. The resulting product consists of a crosslinked polymer matrix incorporating dyestuff molecules within its structure, which dramatically enhances the durability, solvent resistance, heat stability and migration fastness of the product. These properties can be further improved by chemically bonding the dyestuff molecules with the crosslinked polymer network, which can be accomplished by judiciously functionalizing the dyestuff with appropriate functional groups designed to polymerize or to react with the curable monomer.

19 Claims, 3 Drawing Sheets

VACUUM-DEPOSITED COLORANTS

BACKGROUND OF THE INVENTION

1. Field of the Invention

This invention is related in general to a process for the manufacture of colorants. In particular, it pertains to the vacuum deposition of pigments in a thermoset cross-linked polymer matrix to form a colorant with heat-stable, solvent-resistant, lightfast, dyestuff properties.

2. Description of the Related Art

Colorants are normally understood in the art to include both pigments and dyestuff. Pigments refer mainly to inorganic salts and oxides, such as iron and chromium oxides, which are usually dispersed in crystal or powder form in an application medium. The color properties of the dispersion depends on the particle size and form of the pigment. Pigment colorants tend to be highly durable, heat stable, solvent resistant, lightfast, and migration fast. On the other hand, they also tend to be hard to process and have poor color brilliance and strength.

Dyes (also called dyestuff) are conventionally understood to refer to organic molecules dissolved, as molecular chromophores, in the application medium. Examples are azo dyes, coumarin dyes, and perylene dyes. The color imparted by dyestuff to the resulting solution depends on the electronic properties of the chromophore molecule. Dyestuff colorants tend to have excellent brilliance and color strength, and are typically easy to process, but also have poor durability, poor heat and solvent stability, and high migration.

Because of the contrasting properties of both types of colorants, much work has been done trying to improve the attributes of each class of colorant (see, for example, U.S. Pat. Nos. 4,017,476, 5,470,502, 5,710,197, 5,795,379, 5,871,872) and to combine the advantages of both into a single product (U.S. Pat. Nos. 4,486,237, 5,106,421, and PCT Publication WO 99/40123). These prior-art improvements have often involved binding dyes in a polymeric matrix to achieve greater color durability, improved heat and solvent stability, and to reduce migration as a result of the stable structure provided by the matrix.

A recent publication describes a similar improvement based on a nanocolorant produced by miniemulsion of dyestuff encapsulated into the polymerized structure of an appropriate monomer/co-surfactant/crosslinker mixture. Thorsten, Clemens et al., "Nanocolorants—Pigments with Dyestuff Properties," Polymer Preprints 2000, 41(1), 24. The resulting colorant has many of the advantages of pigments, especially good migration fastness, and of dyes, especially high brilliance and good dispersability.

All prior-art approaches to the manufacture of colorants with the combined advantages of pigments and dyestuff have been through wet chemistry. These chemical processes produce polymers capable of encapsulating dyes, but typically require relatively long process times and the undesirable step of handling solvents. The range of application of chemical processes is limited by the solubility of the dyes of interest, and the homogeneity of the resulting colorant is dependent on the particle size of the initial dye dispersion. In addition, wet chemistry processes are not suitable for the production of colored metalized films or flakes, for which there exists an ever increasing demand in the market place.

Therefore, there is still a need for a better approach to the process of immobilizing dispersed dyes in a thermoset crosslinked polymer in order to combine the advantages of both pigments and dystuffs within the same colored material. This invention is directed at a process for achieving this objective by flash vapor deposition followed by radiation curing of the various constituents.

BRIEF SUMMARY OF THE INVENTION

The primary objective of this invention is a method for producing a colorant with the combined attributes of pigments and dyestuffs.

Another important objective is a process that produces a perfect, molecular-level dispersion of a dye within a matrix to produce a colored film product or a colored nano-flake for further application in an appropriate carrier medium.

Another goal is a dye-like colorant that is not extractable and therefore is very stable under all normal conditions of use.

Another objective is a process that can be implemented at a high production rate.

Still another objective is a process that can be implemented without the use of solvents.

Another goal is a process that produces a highly homogeneous, defect-free thin film.

Another objective is a process that makes it possible to produce colors within ranges that are not limited by the solubility of the dyes of interest in a solvent medium.

Specifically, a goal of the invention is a process for manufacturing colored metallized films.

Another specific goal is a process for manufacturing colored metal flakes.

Another objective is a procedure that can be implemented utilizing modified prior-art vapor deposition technology.

A final objective is a procedure that can be implemented easily and economically according to the above stated criteria.

Therefore, according to these and other objectives, the present invention consists of selecting a radiation curable monomer or oligomer that is known to produce a polymeric matrix having desirable characteristics for a particular application and a dyestuff that can be flash evaporated in a vacuum deposition chamber. The monomer/oligomer and the dystuff are mixed in a curable formulation and fed into a hot evaporator under vacuum. The blend is flash evaporated through a nozzle and recondensed onto a moving substrate in contact with a temperature-controlled rotating drum. The condensed film is then cured with a high-energy ultraviolet or electron-beam source, or any other high-energy radiation source, to effect cross-linking of the monomer/oligomer.

The resulting film product consists of a crosslinked polymer matrix incorporating dyestuff molecules within its structure. Encapsulating the dyestuff molecules within the crosslinked polymer network dramatically enhances the durability, solvent resistance, heat stability and migration fastness of the product. According to another aspect of the invention, these properties can be further improved by bonding the dyestuff molecules with the crosslinked polymer network, which can be accomplished by judiciously functionalizing the dyestuff with appropriate functional groups designed to polymerize or to react with the curable monomer/oligomer.

The homogeneous or heterogeneous colorant mixture prepared for vacuum deposition is typically liquid and vaporized in conventional manner. If a substantially solid (or waxy) mixture is used, it is preferably granulated and fed into an extruder where the solid particles are heated and gradually melted as they advance toward the extruder's outlet. A nozzle is used to shape the liquified material into a thin film that is deposited on the revolving hot drum of a conventional vacuum evaporator, whereby the liquid film flashes into a homogeneous vapor that is subsequently cryocondensed to form a thin film in conventional manner.

According to still another aspect of the invention, the solid colorant so produced can be separated from the substrate and crushed to yield colored flakes. These can then be used as colorant ingredients according to conventional practice.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

DESCRIPTION OF THE PREFERRED EMBODIMENTS OF THE INVENTION

Figure 1:
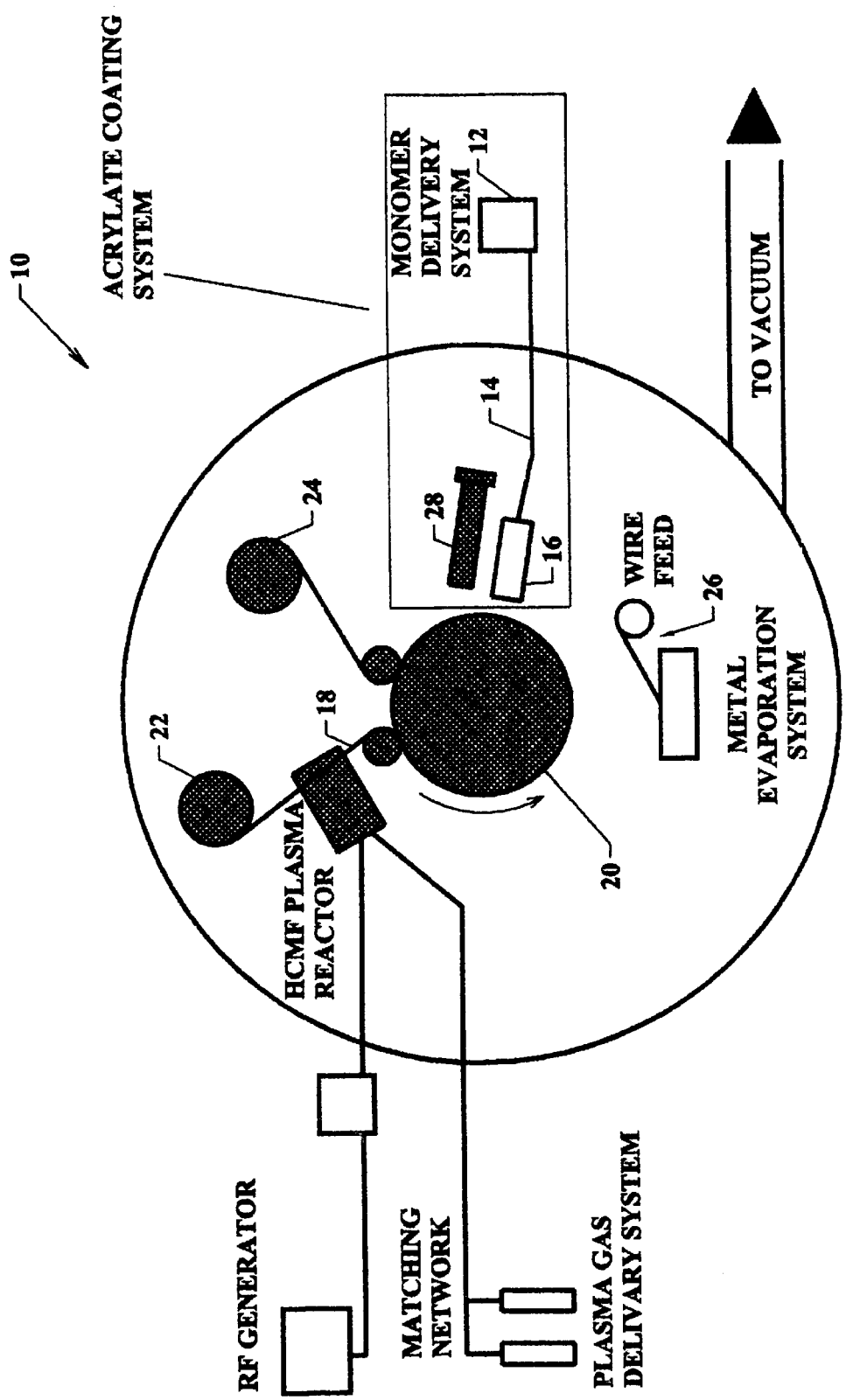
FIG. 1 is a schematic representation of a conventional vacuum vapor deposition and radiation curing unit.

The heart of this invention lies in the recognition that the encapsulation of dyes in a polymeric matrix, heretofore accomplished by wet chemistry for the purpose of advantageously combining the attributes of pigments and dyestuffs in a single colorant, is best achieved by vapor deposition under vacuum. The vaporization of a blend produces a perfectly homogeneous mixture first in the vapor state and subsequently in the cured and crosslinked state, regardless of the homogeneous or heterogeneous condition of the original blend. Therefore, the invention yields products with perfectly homogeneous colors. Similarly, since the dye is mixed with the curable monomer in the vapor state, the mixture occurs at the molecular level, rather than at the particle-dispersion level applicable to solvent- or water-based chemical processes, further improving the degree of encapsulation and/or bonding of the dye within the polymeric structure. Moreover, since the dyestuff/monomer blend is capable of vaporizing and subsequently fully recondensing in any relative proportion, the process of the invention is not limited by the solubility of the dyestuff in a carrier, as is the case with prior-art wet-chemistry processes.

Based on these ideas, a dye of interest is selected in a concentration designed to produce the desired hue in combination with a polymeric matrix appropriate for a particular application. For example, radiation-curable monomers and oligomers suitable for the invention include mono-, di- or multifunctional acrylates and methacrylates functionalized, without limitation, with hydroxyl, carboxylic, ether, amino, cyano, sulfonic, silicone or fluorinated functional groups. Others are mono-, di- or multifunctional vinyl ethers functionalized, without limitation, with hydroxyl, carboxylic, ether, amino, cyano, sulfonic, silicone or fluorinated functional groups. Still others are mono-, di- or multifunctional cycloaliphatic epoxide monomers functionalized, without limitation, with ester, ether, cyano, silicone or fluorinated functional groups. Further examples include hydrocarbon vinyl monomers such as, without limitation, styrenes, divinylbenzene and butadienes.

Any dyestuff molecule that can be evaporated in a vacuum chamber is suitable for the invention. The dyestuff molecule may be incorporated inside the crosslinked polymer matrix with or without chemical bonding. In order to form a chemical bond between the dyestuff molecule and the crosslinked polymeric structure, the dyestuff molecule must be functionalized with certain functional groups. Such functionalized dyestuff molecules are, for example, any dye (such as azo dyes) that contain an amino group that will undergo Michael's nucleophilic addition reaction with acrylate functional groups in the resin used for the process. Similarly, dyes that contain hydroxyl groups will interact with epoxy groups in the resin; and dyes that contain acrylate or metacrylate functional groups will copolymerize with acrylic resins. Finally, but without limitation, acid-base interaction between the dye molecules and the resin molecules will produce bonds between the two. For example, acidic dyes will interact with basic resins and basic dyes with acidic resins, as would be readily apparent to one skill in the art.

As used herein, the term "colorant" is intended to refer to any substance possessing and capable of imparting a color or hue to an application medium. The term "pigment" is intended to refer mainly to a colorant that includes an inorganic salt or oxide, usually dispersed in crystal or powder form in an application medium. The terms "dye" and "dyestuff" are intended to refer to colorants that include organic molecules dissolved, as molecular chromophores, in an application medium.

As used herein, the term oligomer is intended to refer not only to molecular chains normally designated as such in the art (typically containing between two and ten monomer molecules) but also to low-molecular weight polymers; specifically, oligomer is meant to encompass any polymerized molecule having a molecular weight sufficiently low to permit its vaporization under vacuum at a temperature lower than its temperature of thermal decomposition. With current vacuum technology, such maximum molecular weight is approximately 5,000, the precise molecular weight depending on the specific monomer used, but it is understood that greater molecular weights would become available for inclusion in the practice of the invention if greater vacuum conditions were obtained. Only the term monomer is mostly used for convenience to describe the invention, but it is intended to include oligomers as well, as oligomers are defined above.

As well known in the art, vapor deposition processes involve the evaporation of a liquid monomer in a vacuum chamber, its deposition on a cold substrate (referred to in the art as "cryocondensation"), and the subsequent polymerization by exposure to high-energy radiation, such as electron-beam or ultraviolet radiation. As illustrated schematically in FIG. 1, the liquid monomer from a supply reservoir 12 is fed through a capillary tube 14 and an atomizer 16 into the heated evaporator section of a vacuum deposition chamber 10 where it flash vaporizes under vacuum. The resulting monomer vapor is then passed into a condensation section of the unit where it condenses and forms a thin liquid film upon contact with the cold surface of an appropriate substrate, such as a film 18, which in turn is in contact with a cold rotating drum 20 as it progresses from a feed roll 22 to a take-up roll 24. A metal vaporization unit 26 may also be used to deposit in line a thin metal layer on the film 18 for multilayer deposition. The liquid deposited film is then cured by exposure to an electron-beam or ultraviolet radiation source 28. Since the ultimate objective is the formation of solid films, the initial liquid monomer must be capable of polymerization and contain enough reactive groups to ensure that a sufficiently large polymeric molecule results and yields a solid product. A conventional plasma-gas delivery system is also used to pretreat the film 18, if desired.

This conventional approach of utilizing a polymerizable monomer as the raw material for thin-film forming processes has been followed over the years to produce various products under the range of operating conditions of commercially available vapor deposition chambers (typically, $10^{-3}$ to $10^{-7}$ torr and 70° C.–350° C.). The monomer mixtures of interest for the present invention are typically liquids of various densities and viscosities, depending on the nature of the curable component and the dye. Accordingly, standard flash evaporation equipment and practices are suitable to practice the invention. In cases where the initial mixture is substantially solid, though (such as when some oligomers are used), a modified evaporation apparatus is necessary.

Figure 2:
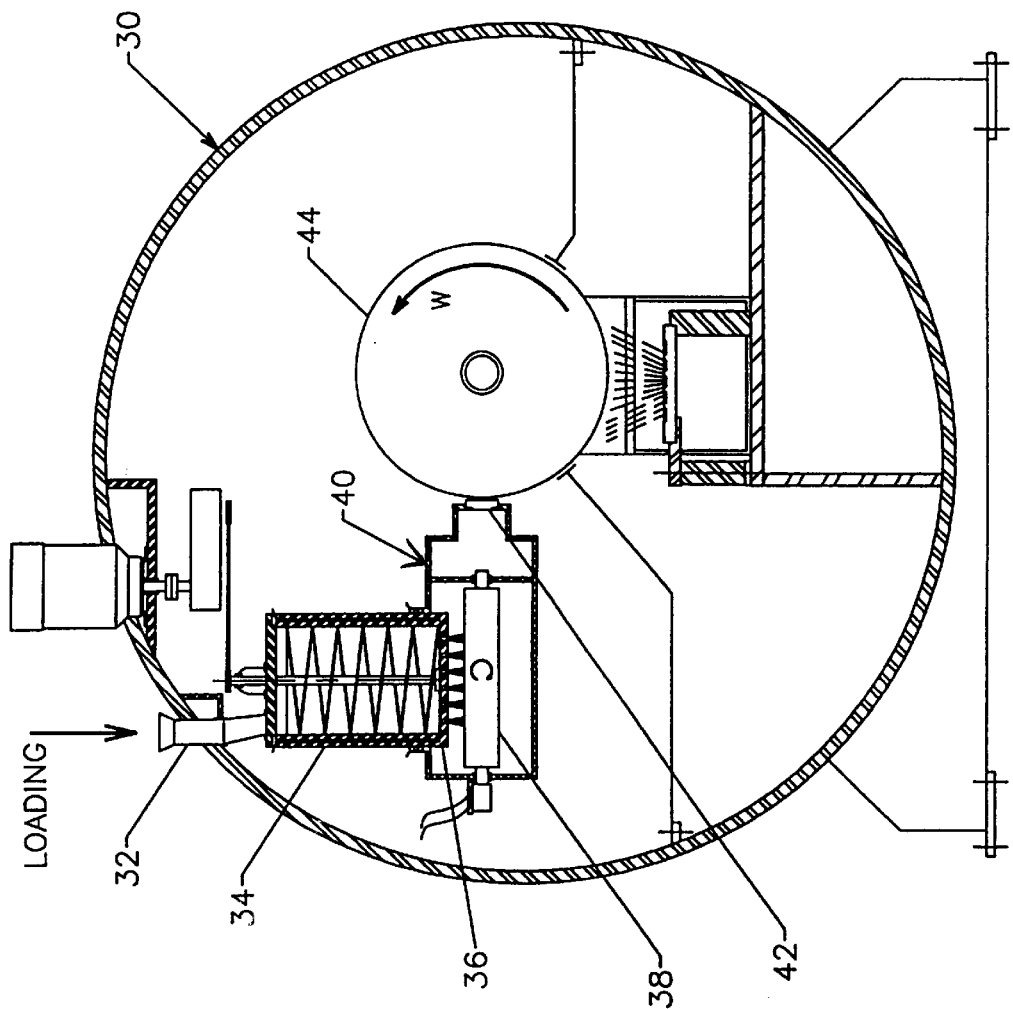
FIG. 2 is a schematic representation of a modified vacuum vapor deposition unit used to flash vaporize solid colorant mixtures according to the invention.
Figure 3:
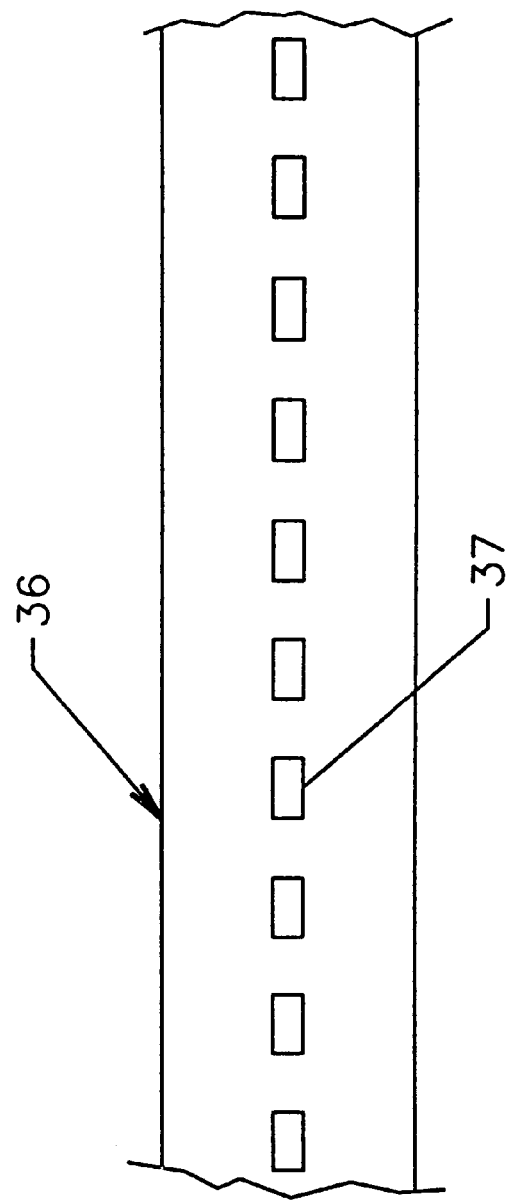
FIG. 3 is a partial schematic representation of the front portion of the nozzle of the unit of FIG. 2.

In commonly-owned copending application Ser. No. 09/346,877, herein incorporated by reference, the inventors disclose a process whereby a solid oligomer is evaporated under vacuum at a temperature lower than its thermal decomposition temperature. The solid oligomer is first liquefied and extruded as a film onto the revolving drum in the evaporation section of a conventional vapor deposition chamber, and it is then cryocondensed on a cold substrate in conventional manner. As described in that application, the solid initial mixture of the present invention can be similarly granulated or otherwise reduced to particles and fed into a hopper for processing in a modified conventional vacuum vapor deposition unit 30, illustrated schematically in FIG. 2. The solid particles are fed from the hopper 32 into a heated extruder 34 that liquefies the material and forces it out of a nozzle 36 as a plurality of thin liquid film strips suitable for flash evaporation. As shown in FIG. 3, each slit opening 37 in the nozzle 36 is about 1–2 mm wide and 4–5 mm long. The nozzle 36 extrudes the liquid film continuously onto a heated rotating drum 38 under vacuum which causes its evaporation upon contact.

The resulting vaporized molecule is then passed through a slit 42 to reach the cryocondensation section in the vapor deposition unit. Upon contact with a cold moving substrate, such as a plastic film in contact with a cold rotating drum 44 (typically kept at −20° C. to 30° C.), the vapor condenses and forms a uniform, homogeneous thin film that quickly solidifies into the final product. As in prior-art vapor deposition units, the thin film may be deposited over the drum 44 to produce a multilayer product or over a web substrate in contact with the drum to produce a film coating. No further polymerization is required to solidify the film.

In order to ensure the uniform deposition of the vaporized material over the condensation drum 44, it is critical that the feed rate of material to the evaporator be controlled precisely. The use of an extruder, which can be run at a well defined and controlled extrusion rate, is ideal for feeding the hot drum in the evaporator section of the vapor deposition unit of the invention. At the same time, the use of a slit nozzle that produces a very thin liquid film of material makes it possible to approximate the very large surface area created by atomization, thereby enabling the immediate vaporization of the liquid feed material upon contact with a hot surface.

In general, the process of the present invention involves the steps of preparing a formulation (either homogeneous or heterogeneous) containing a dyestuff and a curable monomer in proportions suitable for the formation of a solid resin matrix incorporating the dyestuff. Preferably, we found that 1–30% w/w dyestuff and 60–95% w/w monomer, with 1–10% w/w suitable catalysts and initiators, provide useful blends to practice the invention. As mentioned, such mixtures are typically liquid at room temperature. Thus, the blend is injected (or, if solid, extruded as a liquid as detailed above) through a nozzle into a hot evaporator at about 300–800° F. under vacuum ($10^{-3}$–$10^{-7}$ torr). The blend is flash evaporated and then cryocondensed onto a moving film that is in good contact with a temperature-controlled rotating drum. The condensed film is then quickly cured (crosslinked) with high-energy ultraviolet or electron-beam radiation to produce a uniformly colored product in the form of a film. The time gap between condensation and crosslinking must be very small (in the order of a microsecond to 100 milliseconds) to avoid any possible crystallization or phase separation. Typical irradiating conditions are 200–400 W/inch for UV treatment; and 5–20 KV with 50–200 mA currents for electron-beam radiation.

Depending on the intended end use, the condensed film can be formed with various different properties designed to produce the desired result. For example, the vapor deposition can be carried out on a clear plastic substrate to produce a colored transparent film, or on a metalized substrate to produce a colored reflective film (shiny or not, depending on the metal layer properties). Similarly, the vapor deposition can be carried out on a substrate treated with a release agent to permit the subsequent separation of the condensed layer to produce flakes. These may be in the form of colored transparent nano-flakes; or colored nano-flakes structured to be reflective (shiny or not shiny) either on one or on both sides.

Thus, an advantageous object of the process of the invention may be the manufacture of metal flakes utilized in pigment production. According to the prior art, the metal flakes are produced by depositing a metal film over a polymeric substrate coated with a polymeric film, and then by separating the metal film from the substrate and crushing it to yield flakes. Existing technology is based on relatively low-rate solvent-based processes for releasing the metal film from the polymeric substrate.

Based on the present disclosure, metal flakes with the desired properties are produced by depositing a metal film over an oligomeric release coating formed by vapor deposition over a substrate according to the invention. The release process can be mechanical peel off, melting of the release coating, or dissolving of the release coating.

The following examples illustrate the invention.
Run No. 1

A heterogeneous formulation containing 15% w/w Disperse red-1 azo dye, 40% w/w ethoxylated bisphenol-a-diacrylate, 20% w/w trimethylol propane triacrylate, 15% w/w tripropylene glycol diacrylate, 5% w/w carboxyl ethyl acrylate, and 5% w/w hydroxyl ethyl methacrylate was prepared by dispersing the red dye in the acrylate blend and stirring at 60° C. for 20 minutes. Then the blend was injected into a hot evaporator (570–600° F.) under vacuum ($10^{-4}$–$10^{-5}$ torr). The blend was flash evaporated through a nozzle and re-condensed onto a moving (200 ft/min) polyester film which was in good contact with a cold (10–20° F.) rotating drum. The substrate film was cleaned and functionalized by in-line plasma treatment. The condensed liquid layer was cured (crosslinked) with a high-energy electron-beam radiation. In this case the product was a very uniform thermoset, 0.1–0.2 micron, red (transparent) film.

Run No. 2

Same as Run No. 1, except that the blend was flash evaporated through a nozzle and re-condensed onto a moving metalized (250–300 A of aluminum) polyester film. In this case the product was a very uniform thermoset, 0.1–0.2 micron, shiny reflective red film.

Run No. 3

Same as Run No. 1, except that the blend was flash evaporated through a nozzle and re-condensed onto a moving, release coated, metalized (250–300 A of aluminum) polyester film. The release layer was between the polyester substrate and the metal layer.

In this case the produced shiny red film was crashed down into small sparkling red metallic flakes.

Run No. 4

Same as Run No. 1, except that the blend was flash evaporated through a nozzle and re-condensed onto a moving, reticulated, metalized (250–300 A of aluminum) polyester film. The reticulated layer (micro-structured, worm-like surface) was deposited between the polyester substrate and the metal layer. In this case the product was a very uniform matte defused reflective red film.

Run No. 5

A homogeneous formulation containing 15% w/w Malachite Green carbinol-base dye, 20% divinyl benzene, 60% 3,4-epoxycyclohexylmethyl 3,4-epoxycyclohexane carboxylate, and 5% of a cationic photoinitiator, was prepared by dissolving the green dye in the monomer blend and stirring at 60° C. for 20 minutes. Then the blend was injected into a hot evaporator (370–400° F.) under vacuum ($10^{-4}$–$10^{-5}$ torr). The blend was flash evaporated through a nozzle and re-condensed onto a moving (200 ft/min) polyester film which was in good contact with a cold (10–20° F.) rotating drum. The substrate film was cleaned and functionalized by in-line plasma treatment. The condensed liquid layer was cured (crosslinked) with a high-energy electron-beam radiation.

For this system, the electron beam dissociates the cationic photoinitiator molecules which initiate the cationic polymerization reaction for both divinyl and epoxy monomers. In this case the product was a very uniform thermoset, 0.1–0.2 micron, green (transparent) film.

Runs No. 1, and 3 were repeated using Malachite Green carbinol-base dye instead of the Disperse red-1. In these cases the products were a green transparent film, a shiny reflective green film, and sparkling green metallic flakes, respectively.

Runs No. 1, 2 and 3 were repeated with using Solvent Blue-35 Azo dye instead of the Disperse red-1. In these cases the products were a blue transparent film, a shiny reflective blue film, and sparkling blue metallic flakes, respectively.

Finally, Runs No. 1, 2 and 3 were repeated with using Sudan Black-B azo dye instead of the Disperse red-1. In these cases the products were a dark brown transparent film, a shiny reflective dark brown film, and sparkling dark brown metallic flakes, respectively.

These examples demonstrate the feasibility of manufacturing colorants by vapor deposition of blends of dyestuffs with curable monomers. The disclosed process possesses the advantages of being solvent-free, environmentally safe, independent of solubility, and high rate. Large areas of product (up to 1000 ft/min, depending on the vacuum deposition equipment) can be produced at low cost. The resulting products are in the form of highly uniform, homogeneous, defect-free colored materials.

It is noted that the invention has been described in terms of dyestuffs being incorporated into a matrix of curable monomer in order to produce a solid colored product with combined colorant properties of dyes and pigments. Nevertheless, if desirable for a particular application, it is clear that the invention can be practiced as well to incorporate pigment molecules into a resin matrix. So long as the pigment substance is capable of vaporization without degradation under the operating conditions of a vacuum deposition chamber, a pigment/monomer blend can be processed according to the invention in a manner equivalent to the method and examples illustrated above.

Various changes in the details, steps and components that have been described may be made by those skilled in the art within the principles and scope of the invention herein illustrated and defined in the appended claims. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

We claim:

1. A process for manufacturing a colored product, comprising the following steps:
   (a) mixing a colorant material with a curable monomer composition to produce a blend;
   (b) evaporating the blend in a vapor deposition unit to produce a vapor at a predetermined pressure and temperature;
   (c) cryocondensing the vapor; and
   (d) curing the monomer composition in the blend to produce a solid polymer incorporating the colorant material;
   wherein said colorant includes a first functional group capable of reacting with a second functional group in the curable monomer, and said step (d) includes curing the blend to produce a bond between the first and second functional groups.

2. The process of claim 1, wherein said colorant includes a dyestuff.

3. The process of claim 1, wherein said step (b) includes flash evaporation.

4. The process of claim 1, wherein said first functional group is an amino group and said second functional group is an acrylate group.

5. The process of claim 1, wherein said first functional group is a hydroxyl group and said second functional group is an epoxy group.

6. The process of claim 1, wherein said first and second functional groups are selected from the group consisting of acrylates and metacrylates.

7. The process of claim 1, wherein said colorant includes an acidic functional group and said monomer includes a basic functional group.

8. The process of claim 1, wherein said colorant includes a basic functional group and said monomer includes an acidic functional group.

9. The process of claim 1, wherein said colorant includes a functional group capable of chemical interaction, and said step (d) includes curing the blend to cause the polymerization of said curable monomer.

10. The process of claim 9, wherein said functional group is selected from the group consisting of acrylates and metacrylates.

11. The process of claim 1, wherein said evaporating step is carried out at a pressure of about $10^{-3}$ to $10^{-7}$ torr.

12. The process of claim 1, wherein said evaporating step is carried out at a temperature of about 70° C.–350° C.

13. The process of claim 1, wherein said cryocondensing step is carried out at a temperature of about –20° C. to 30° C.

14. The process of claim 1, wherein said step (d) is carried out within 100 milliseconds after completion of step (c).

15. A colorant product manufactured according to the process of claim 2.

16. A colorant product manufactured according to the process of claim 3.

17. A colorant product manufactured according to the process of claim 1.

18. A process for manufacturing a colored product, commmprising the following steps:

(a) mixing a colorant material with a curable monomer composition to produce a blend;

(b) evaporating the blend in a vapor deposition unit to produce a vapor at a predetermined pressure and temperature;

(c) cryocondesing the vapor;

(d) curing the monomer composition in the blend to produce a solid polymer incorporating the colorant material; and (e) curshing said solid polymer to produce colored flakes.

19. A colorant product manufactured according to the process of claim 18.

* * * * *